Figure 1:
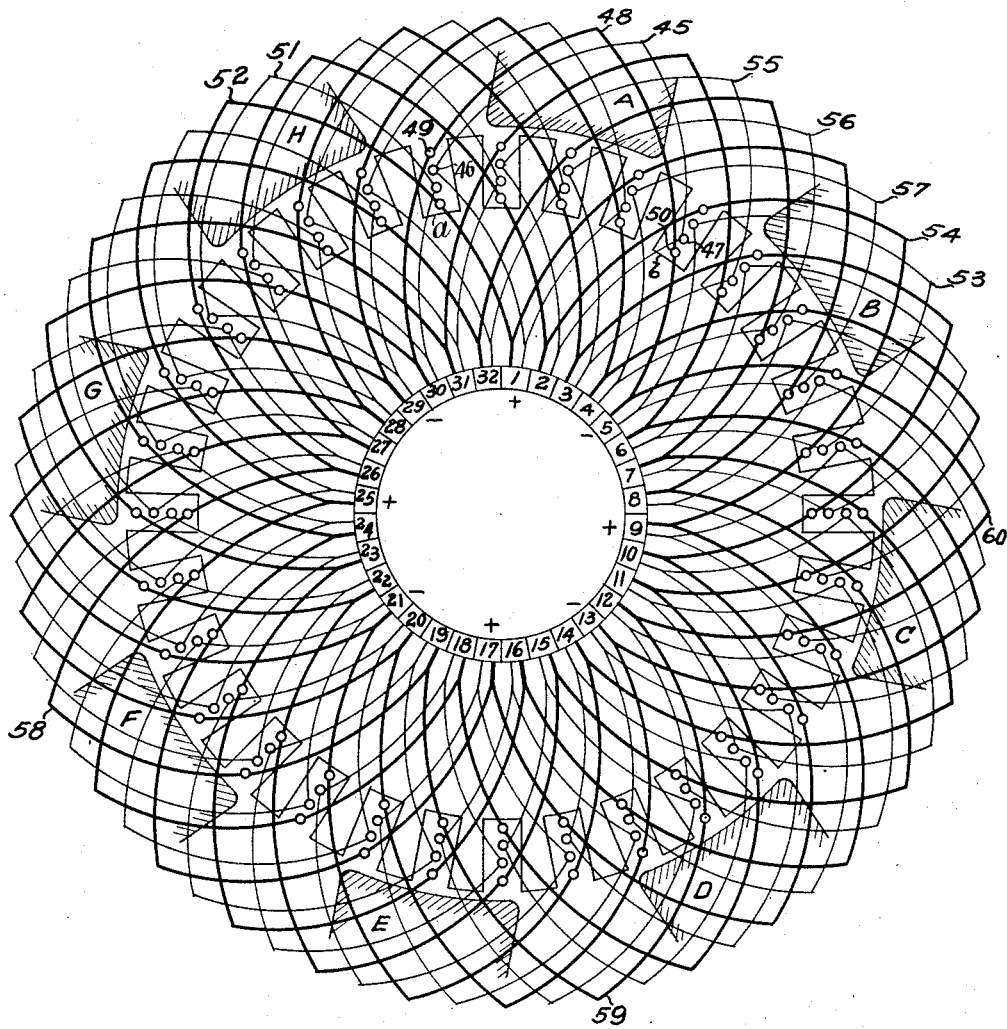

Sept. 6, 1927.  
W. H. POWELL  
1,641,644  
DYNAMO-ELECTRIC MACHINE AND WINDING THEREFOR  
Original Filed May 16, 1924   2 Sheets-Sheet 1

Patented Sept. 6, 1927.

1,641,644

UNITED STATES PATENT OFFICE.

WILLIAM H. POWELL, OF WAUWATOSA, WISCONSIN, ASSIGNOR TO ALLIS-CHALMERS MANUFACTURING COMPANY, OF MILWAUKEE, WISCONSIN, A CORPORATION OF WISCONSIN.

DYNAMO-ELECTRIC MACHINE AND WINDING THEREFOR.

Original application filed May 16, 1924, Serial No. 713,723. Divided and this application filed March 15, 1926. Serial No. 94,812.

This invention relates to dynamo-electric machines and windings therefor.

The objects of the invention are the same as those set forth in applicant's copending application Serial No. 713,723, filed May 16, 1924 and of which latter the present application is a division.

It is at times desirable or necessary to use a slotted armature for dynamo-electric machines in which the number of slots per pole as well as the slots per pair of poles is an integer. The present application relates to that embodiment of the invention broadly claimed in the hereinbefore mentioned copending application, in which embodiment the hereinbefore mentioned condition obtains.

The novel features will appear from this specification and accompanying drawings forming a part thereof and disclosing one embodiment of the invention and all of the novel features are intended to be pointed out in the claims.

In the drawings:

Fig. 1 is a diagrammatic showing of a dynamo-electric machine illustrating one embodiment of the invention.

Figure 2:
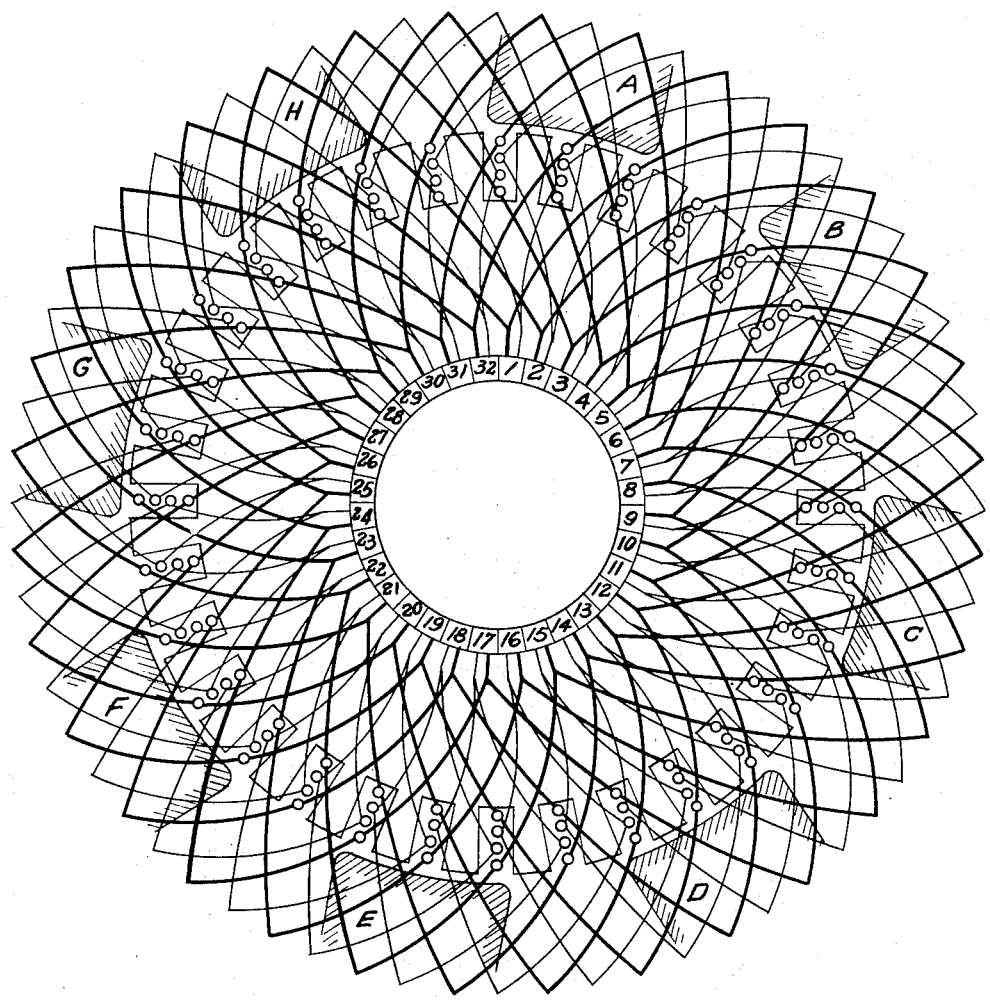

Fig. 2 is a diagrammatic showing of a dynamo-electric machine illustrating a modification of the invention.

Referring to Fig. 1, the machine here illustrated is provided with eight poles A, B, C, D, E, F, G, H. The armature is of the slotted type, the number of slots being 32 and the commutator segments or bars of the same number. Each slot is shown as containing four conductors and as each conductor represents one side of a coil or winding element, there is a total of 64 coils all connected to the same commutator. Of the 64 coils, 32 coils are wound in the form of a simplex lap winding and the remaining 32 coils are wound in the form of a wave winding. The wave winding here shown is of the simplex type inasmuch as all of the conductors are included in tracing from a given starting point back to the same starting point, but it is quadruply re-entrant and therefor has eight circuits, which is the same as the number of circuits in the lap winding. It is of course to be understood that the invention is not at all restricted to any specific number of poles, slots, coils and commutator bars except that the present application relates to that particular condition in which the number of slots per pole is an integer.

Considering the winding of Fig. 1 more specifically, it will be noted that a given lap coil, as for example coil 45, has one of its coil sides 46 in slot $a$. In considering the position of the conductors or coil sides in a slot the radially outermost conductor may be designated as disposed in position No. 1, the next conductor, counting radially inwards, as No. 2 and so on. Coil side 46 is thus in position No. 2. The other coil side 47 of coil 45 is in position No. 3 in a slot $b$ which, in the present instance, is four slots from slot $a$. As there are 32 slots and 8 poles and therefore 4 slots per pole, the winding is a full pitch winding. The back conductor pitch of both the lap and wave coils is 9. The front conductor pitch of the wave coil is 5 and of the lap coils 7. All of the lap coils are positioned in the slots similarly to coil 45, that is, they are in positions Nos. 2 and 3. This is however not essential; the lap coils could, for example, occupy positions Nos. 1 and 4. It is moreover not essential that the winding be a full pitch one, as illustrated in Fig. 2.

Considering a coil 48 of the wave winding, this has a coil side 49 disposed in position No. 1 of slot $a$, and another coil side 50 disposed in position No. 4 of slot $b$. The slot pitch of this coil is therefore also 4 in this instance. Lap coil 45 and wave coil 48 thus account for positions Nos. 1 and 2 in slot $a$ and positions Nos. 3 and 4 in slot $b$. It is therefore clear that these coils may be taped up together and the unit thus formed may be laid in the slots in the same manner as is the practice with an ordinary lap coil. It will be noted that the front end-connectors of lap coil 45 run toward each other and are conected to commutator bars 1 and 2. The front end-connecters of wave coil 48 diverge relatively and are connected to commutator bars 30 and 5. It is therefore clear that with the consideration of lap coil 45 and wave coil 48 all of the coils in the winding are accounted for because all of the other similar pairs of lap and wave coils are similarly located in the successive slots.

The lap coils are balanced against the wave coils group by group. For example, the four consecutive lap coils 45, 55, 56 and 57 are balanced against wave coils 52, 58, 59 and 60. That is, the said four lap coils are disposed to generate the same E. M. F. as the said four wave coils, and the four lap coils are influenced by two adjacent poles whereas the four wave coils are influenced by all of the poles. Moreover, each commutator bar is connected to every other bar 360 electrical degrees from it which should operate at the same potential, through a lap coil and a wave coil generating substantially equal E. M. F.'s. Also each bar has connected thereto two pairs of coils, the respective coils of each pair being disposed to generate substantially equal E. M. F.'s. For example, bar 5 has connected thereto the pair of coils 48, 53 and the pair of coils 57 and 60. The foregoing is all explained in greater detail in applicant's hereinbefore metioned copending application.

It will be noted that the slot pitch and the back conductor pitch of the lap and wave coils is equal.

Referring to Fig. 2, this shows a machine having the same factors as the machine of Fig. 1 except that the slot pitch of the lap and wave coils is 3. As in Fig. 1, the lap winding is indicated by the light lines and the wave winding by the heavy lines. The back conductor pitch of both lap and wave coils is 7. The front conductor pitch of the wave coils is also 7 but the front conductor pitch of the lap coils is 5. The average of the front and back conductor pitches of the wave winding in Fig. 2 is the same as the average in Fig. 1 and this average in both cases is equal to the difference between the number of conductors in the wave winding and the number of circuits in the lap winding divided by the number of poles so that the wave winding will have the same number of circuits as the lap winding.

It is to be understood that the present invention is also applicable to multiplex windings, where, for example, the lap winding component of the winding comprises three independent lap windings termed a triplex winding, as disclosed in applicant's hereinbefore mentioned copending application, or any case in which it is permissible to make the number of slots per pole an integer.

It should be understood that it is not desired to limit the invention claimed to the exact details of construction shown and described, for obvious modifications may occur to persons skilled in the art.

It is claimed and desired to secure by Letters Patent:

1. In a commutator type multipolar dynamo-electric machine having a slotted armature the number of slots per pole being an integer, means for equalizing the currents in the armature winding including a lap type winding and a wave type winding both connected to said commutator, the coils of both of said windings being of equal slot pitch and each commutator segment having connected thereto two pairs of coils, the respective coils of each pair being disposed to generate substantially equal E. M. F.'s.

2. A multipolar dynamo-electric machine having a slotted armature of the commutator type the number of slots per pole being an integer, a winding for said armature including a lap type winding and a wave type winding, a group of consecutive lap coils of predetermined number, a group of consecutive wave coils of the same number, the terminals of said groups being connected to the same commutator segments, said group of wave coils being positioned with respect to the pairs of poles so that it is influenced by all of the pairs, the coils of both of said windings being of equal slot pitch.

3. A multipolar dynamo-electric machine having an armature, a winding for said armature including a lap winding and a simplex wave winding, said wave winding being multiply reentrant and having an average front and back conductor pitch equal to the difference between the number of conductors in said wave winding and the number of circuits in said lap winding divided by the number of poles, the coils of the lap and wave windings having their back conductor pitches equal.

4. In a commutator type dynamo-electric machine having a slotted armature the number of slots per pole being an integer, means for equalizing the currents in the armature winding including a lap winding and a wave winding both connected to said commutator, the coils of both of said windings having a slot pitch equal to the number of slots per pole.

5. In a commutator type dynamo-electric machine having a slotted armature the number of slots per pole being an integer, an armature winding including a lap winding and a wave winding connected to said commutator, a group of consecutive lap coils of predetermined number, a group of consecutive wave coils of the same number, the terminals of said groups being connected to the same commutator segments the coils of both of said windings having a slot pitch equal to the number of slots per pole.

6. In a commutator type dynamo-electric machine having a slotted armature the number of slots per pole being an integer, an armature winding including a lap winding and a wave winding connected to said commutator, a group of consecutive lap coils disposed in said slots, a group of consecutive wave coils disposed in said slots to generate substantially the same E. M. F. as said lap coils, the terminals of said groups being connected to the same commutator segments, the coils of both of said windings having a slot pitch equal to the number of slots per pole.

In testimony whereof, the signature of the inventor is affixed hereto.

WILLIAM H. POWELL.

CERTIFICATE OF CORRECTION.

Patent No. 1,641,644. Granted September 6, 1927, to

WILLIAM H. POWELL.

It is hereby certified that the State of Incorporation of the assignee in the above numbered patent was erroneously given as "Wisconsin" whereas said State should have been given as "Delaware" as shown by the records of assignments in this office; and that the said Letters Patent should be read with this correction therein that the same may conform to the record of the case in the Patent Office.

Signed and sealed this 11th day of October, A. D. 1927.

Seal.

M. J. Moore,
Acting Commissioner of Patents.